US00RE39960E

(19) United States
(12) Reissued Patent
Korkmaz et al.

(10) Patent Number: US RE39,960 E
(45) Date of Reissued Patent: Dec. 25, 2007

(54) AUTOMATIC TRANSMISSION FOR MOTOR VEHICLES

(75) Inventors: Bülent Korkmaz, Hamm (DE); Walter Kuhn, Friedrichshafen (DE); Bernhard Drerup, Kressbronn (DE); Hans-Jorg Domian, Immenstaad (DE); Gerhard Gumpoltsberger, Friedrichshafen (DE)

(73) Assignee: ZF Friedrichshafen AG, Friedrichshafen (DE)

(21) Appl. No.: 10/782,749

(22) PCT Filed: Mar. 16, 2000

(86) PCT No.: PCT/EP00/02337

§ 371 (c)(1),
(2), (4) Date: Sep. 13, 2001

(87) PCT Pub. No.: WO00/57082

PCT Pub. Date: Sep. 28, 2000

Related U.S. Patent Documents

Reissue of:
(64) Patent No.: 6,572,507
Issued: Jun. 3, 2003
Appl. No.: 09/936,477
Filed: Sep. 13, 2001

(30) Foreign Application Priority Data

Mar. 22, 1999 (DE) ..... 199 12 480

(51) Int. Cl.
*F16H 3/62* (2006.01)

(52) U.S. Cl. ..... 475/276
(58) Field of Classification Search ..... 475/275, 475/276
See application file for complete search history.

(56) References Cited

U.S. PATENT DOCUMENTS 3,776,066 A 12/1973 Piret
3,977,272 A 8/1976 Neumann
4,070,927 A 1/1978 Polak ..... 74/765
4,395,925 A 8/1983 Gaus
4,732,253 A 3/1988 Hiramatsu et al.
4,939,955 A 7/1990 Sugano ..... 475/278
5,106,352 A 4/1992 Lepelletier
5,232,411 A 8/1993 Hayashi et al.

(Continued)

FOREIGN PATENT DOCUMENTS

DE 26 19 895 11/1976
DE 29 36 969 A1 4/1981
DE 38 25 733 A1 2/1989
DE 42 24 360 A1 1/1993
DE 42 24 361 A1 * 1/1993
DE 43 02 518 A1 8/1993
DE 43 32 466 A1 3/1995
DE 38 25 733 C2 * 7/1996

(Continued)

*Primary Examiner*—Dirk Wright
(74) *Attorney, Agent, or Firm*—Davis Bujold & Daniels, P.L.L.C.

(57) ABSTRACT

The invention concerns a transmission (1) with automatic shifting capabilities and with three spider supported planetary sets (2, 3, 4), three brakes (5, 6, 7), and two clutches (8, 9) for the shifting of six forward moving gears and one reverse gear and having an input shaft (10) and an output shaft (11). In this way, the input shaft (10) is in continual connection with the sun gear (16) of the second planetary set (3) and the input shaft (10) is connectable to the sun gear (12) of the first planetary set (2) by means of the first clutch (8) and/or by means of the second clutch (9) is also connectable with the spider (15) of the first planetary set (2). Further, the sun gear (12) of the first planetary set (2) by means of the first brake (5) and or the spider (15) of the first planetary set (2) by means of the second brake (6) and/or the sun gear (20) of the third planetary set (4) by means of the third brake, are all connectable with the housing of the transmission.

25 Claims, 3 Drawing Sheets

U.S. PATENT DOCUMENTS

| | | | | |
|---|---|---|---|---|
| 5,250,011 | A | 10/1993 | Pierce | 475/276 |
| 5,295,924 | A | 3/1994 | Beim | 475/275 |
| 5,308,295 | A | 5/1994 | Michioka et al. | |
| 5,435,792 | A | 7/1995 | Justice et al. | 475/276 |
| 5,439,088 | A | 8/1995 | Michioka et al. | |
| 5,460,579 | A | 10/1995 | Kappel et al. | 475/276 |
| 5,520,588 | A | 5/1996 | Hall, III | |
| 5,533,945 | A | 7/1996 | Martin et al. | 475/276 |
| 5,536,220 | A | 7/1996 | Martin | 475/275 |
| 5,542,889 | A | 8/1996 | Pierce et al. | |
| 5,647,816 | A | 7/1997 | Michioka et al. | |
| 5,735,376 | A | 4/1998 | Moroto et al. | |
| 6,139,463 | A | 10/2000 | Kasuya et al. | |
| 6,471,616 | B2 | 10/2002 | Stevenson | |
| 6,558,287 | B2 | 5/2003 | Hayabuchi et al. | |
| 6,572,507 | B1 | 6/2003 | Korkmaz et al. | |
| 6,634,980 | B1 | 10/2003 | Ziemer | |
| 6,723,018 | B2 | 4/2004 | Hayabuch et al. | |
| 6,773,370 | B2 * | 8/2004 | Martyka et al. | 475/275 |
| 2002/0091032 | A1 | 7/2002 | Hayabuchi et al. | |
| 2002/0183160 | A1 | 12/2002 | Kao et al. | |
| 2003/0060322 | A1 | 3/2003 | Raghavan et al. | |
| 2003/0083174 | A1 | 5/2003 | Tabata et al. | |
| 2003/0119623 | A1 | 6/2003 | Stevenson et al. | |
| 2003/0162625 | A1 | 8/2003 | Raghavan et al. | |
| 2004/0092357 | A1 | 5/2004 | Biermann | |
| 2004/0097324 | A1 | 5/2004 | Ziemer | |
| 2004/0116238 | A1 | 6/2004 | Ziemer | |

FOREIGN PATENT DOCUMENTS

| | | | |
|---|---|---|---|
| DE | 197 02 198 | A1 | 7/1998 |
| DE | 198 33 376 | A1 | 12/1999 |
| DE | 199 12 480 | A1 | 9/2000 |
| DE | 199 12 481 | A1 | 9/2000 |
| DE | 199 49 507 | A1 | 4/2001 |
| DE | 696 16 117 | T2 | 7/2002 |
| DE | 102 00 379 | A1 | 8/2002 |
| DE | 101 15 983 | A1 | 10/2002 |
| DE | 101 15 987 | A1 | 10/2002 |
| DE | 102 13 820 | A1 | 10/2002 |
| DE | 101 46 606 | A1 | 4/2003 |
| DE | 102 50 374 | A1 | 6/2003 |
| DE | 101 62 877 | | 7/2003 |
| DE | 101 62 883 | A1 | 7/2003 |
| DE | 101 62 888 | | 7/2003 |
| EP | 0 434 525 | A1 | 6/1991 |
| EP | 0 605 953 | A1 | 7/1994 |
| EP | 0 719 961 | A2 * | 7/1996 |
| EP | 1 265 006 | A2 | 12/2002 |
| JP | 4290649 | | 10/1992 |
| JP | 08200456 | | 8/1996 |
| JP | 10259861 | A | 9/1998 |
| JP | 2000240741 | | 9/2000 |
| JP | 2001082555 | | 3/2001 |
| JP | 2002323098 | | 11/2002 |
| WO | 96/01381 | * | 1/1996 |

* cited by examiner

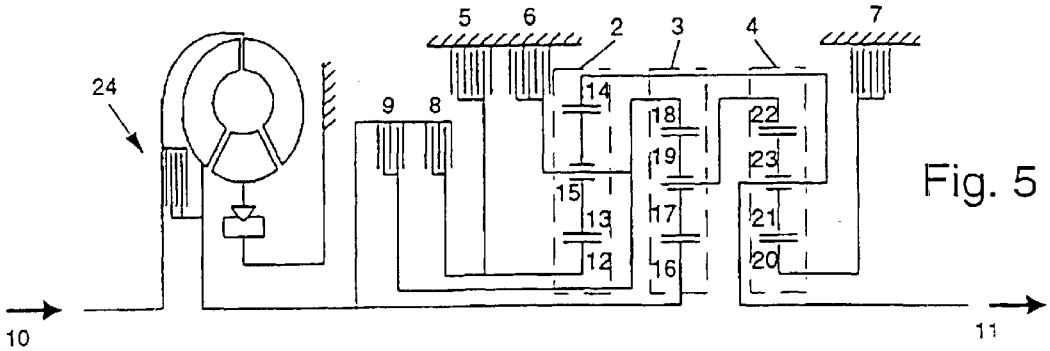
Fig. 5
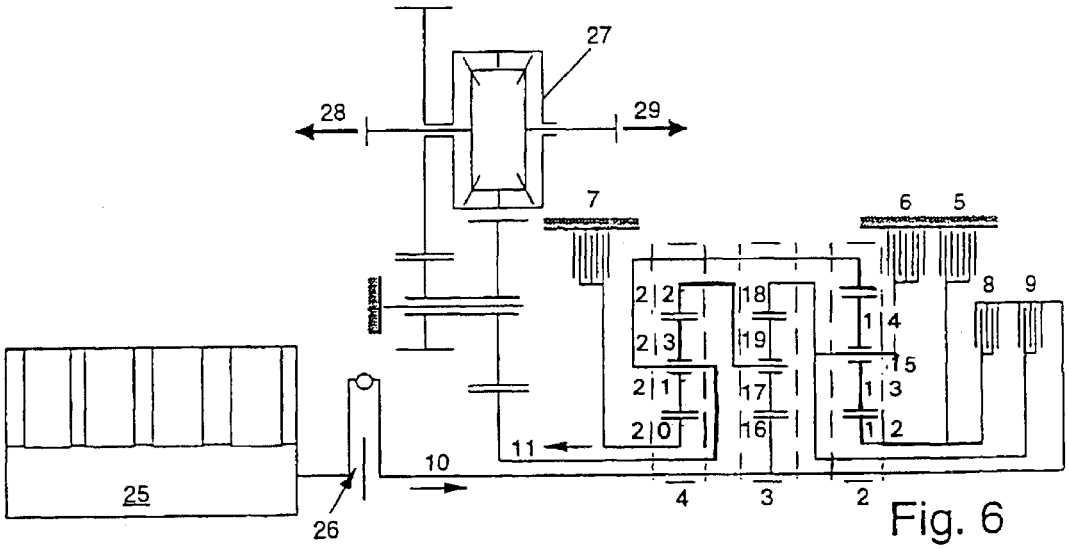
Fig. 6
| | 1. Gear | 2. Gear | 3. Gear | 4. Gear | 5. Gear | 6. Gear | R Gear | $\varphi_{ges}$ |
|---|---|---|---|---|---|---|---|---|
| i | 5,70 | 3,33 | 1,98 | 1,41 | 1,0 | 0,78 | -3,47 | 7,34 |
| φ | 1,71 | 1,68 | 1,41 | 1,41 | 1,29 | | | |
$i_{01}$ = -3,47 $i_{02}$ = -3,05 $i_{01}$ = -2,46
Fig. 7
| | 1. Gear | 2. Gear | 3. Gear | 4. Gear | 5. Gear | 6. Gear | R Gear | $\varphi_{ges}$ |
|---|---|---|---|---|---|---|---|---|
| i | 5,49 | 3,26 | 2,08 | 1,44 | 1,0 | 0,80 | -3,91 | 6,89 |
| φ | 1,68 | 1,57 | 1,44 | 1,44 | 1,25 | | | |
i01 = -3,91 i02 = -2,80 i01 = -2,25
Fig. 8

| | 1. Gear | 2. Gear | 3. Gear | 4. Gear | 5. Gear | 6. Gear | R Gear | $\varphi_{ges}$ |
|---|---|---|---|---|---|---|---|---|
| i | 4,84 | 2,98 | 1,90 | 1,41 | 1,0 | 0,77 | -3,28 | 6,32 |
| φ | 1,62 | 1,57 | 1,35 | 1,41 | 1,30 | | | |

$i_{01}$ = -3,28 $i_{02}$ = -2,43 $i_{01}$ = -2,43

Fig. 9

| | 1. Gear | 2. Gear | 3. Gear | 4. Gear | 5. Gear | 6. Gear | R Gear | $\varphi_{ges}$ |
|---|---|---|---|---|---|---|---|---|
| i | 3,87 | 2,48 | 1,74 | 1,38 | 1,0 | 0,76 | -3,26 | 5,06 |
| φ | 1,56 | 1,43 | 1,27 | 1,38 | 1,31 | | | |

$i_{01}$ = -3,26 $i_{02}$ = -2,87 $i_{01}$ = -1,71

Fig. 10

| | 1. Gear | 2. Gear | 3. Gear | 4. Gear | 5. Gear | 6. Gear | R Gear | $\varphi_{ges}$ |
|---|---|---|---|---|---|---|---|---|
| i | 3,83 | 2,30 | 1,62 | 1,30 | 1,0 | 0,79 | -3,67 | 4,88 |
| φ | 1,67 | 1,42 | 1,25 | 1,30 | 1,27 | | | |

$i_{01}$ = -3,67 $i_{02}$ = -2,83 $i_{01}$ = -2,22

Fig. 11

| GEAR | K1 | K2 | B1 | B2 | B3 |
|---|---|---|---|---|---|
| 1 | | | | × | × |
| 2 | | | × | | × |
| 3 | × | | | | × |
| 4 | | × | | | × |
| 5 | × | × | | | |
| 6 | | × | × | | |
| R | × | | | × | |
| Braked Neutral | | | × | × | |

Fig. 12
(Amended)

AUTOMATIC TRANSMISSION FOR MOTOR VEHICLES

Matter enclosed in heavy brackets [ ] appears in the original patent but forms no part of this reissue specification; matter printed in italics indicates the additions made by reissue.

FIELD OF THE INVENTION

The present invention concerns a motor vehicle transmission capable of automatic shifting, with three spider mounted, planetary sets, three braking mechanisms, two couplings for six forward gear changes and one reverse gear change as well as one input drive shaft and one output drive shaft.

BACKGROUND OF THE INVENTION

A planetary transmission of this nature has been made known by U.S. Pat. No. 4,070,927, wherein the number of the forward gears is respectively greater by one than the numbers of the frictional elements. At each gear change between the forward gears, one of the provided frictional elements is shifted in or out.

Thus, the purpose of the invention is to make available a new and improved transmission, which avoids the known faults and yet fulfills the above mentioned advantages. Further the purpose will include a desirable construction and arrangement of a start-up element as well as make possible a desirable design of the input and output of power.

In accord with the invention, this purpose will be achieved by a transmission for a motor vehicle with automatic shifting capabilities of the type mentioned in the introductory passages [with the features of claim 1] *above*.

In accordance with the invention, this purpose will be achieved by a transmission for a motor vehicle with automatic shifting capabilities.

SUMMARY OF THE INVENTION

In this way, an automatically shiftable vehicle transmission is available, with six forward gears, and one reverse gear which, advantageously for motor vehicles, exhibits a very well adapted gear ratio with a high over-all range and favorable gear change stages, as well as a high start-up ratio in the forward direction. Further the fifth gear is a direct gear. A transmission of this nature is adaptable both for passenger vehicles and for commercial vehicles and characterizes itself by a modest cost of construction, that is, two clutches and three brakes, wherein, in the case of sequential shifting, double shift is avoided and thus, with any desired shifting within a group of gears, respectively only two shifting elements are changed.

The transmission in accord with the invention can be made in an advantageous manner in two versions, wherein these versions differ from one another by the varying connections within the individual planetary sets. In the first version, provision is made, that the power take-off shaft is continually connected to the spider of the third planetary gear set and with the internal gear of the first planetary set. Provision is further made, in that the spider of the first planetary set is continually connected to the internal gear of the second planetary set and the spider of the second planetary set is continually connected with the internal gear of the third planetary set.

The power input drive shaft and the power output drive shaft can, in this design, be coaxial with one another in opposite sides of the transmission housing as well as on the same side of the said transmission housing. Further, a placement of the power takeoff drive between the planetary sets and the clutches is possible.

In a development in accord with a second version: the power takeoff drive is continually in connection with the spider of the second planetary set and with the internal gear of first planetary set; the spider of the first planetary set is continually in connection with internal gear of the third planetary set 4, and the internal gear of the second planetary set is continually in connection with the spider of the third planetary set. A design of this kind is especially well adapted for a coaxial arrangement of power input and power take-off shafts.

A development of the invention proposes, that the first clutch be activated in the first and fifth gear, as well as the reverse gear, and that the second clutch is activated in the fourth, fifth and sixth gear.

The first brake is activated in the second and sixth gear, the second brake is available for the first and reverse gears and the third brake is activated in the first, second, third and fourth gear. In this way, the achievement is advantageously made, that each time, only one shifting element for each optional shift between the first and the fourth gear, between the third and firth gear and between the fourth and sixth gear is changed. Thus, when sequential shifting is carried out, double shifting is avoided.

Further goals, features, advantages, and application possibilities of the invention are made known from the following description of an embodiment example, which is more closely detailed by reference to the drawings. In this way, all described and/or illustrated features, of themselves, or in optional, advantageous combination, form the object of the invention, independently from their condensation in the claims and the inter-references of said claims.

BRIEF DESCRIPTION OF THE DRAWINGS

The invention will now be described, by way of example, with reference to the accompanying drawings in which:

FIG. 5 in schematic presentation, a transmission with a torque converter for a standard transmission assembly, FIG. 6 in schematic presentation, a transmission in accord with the first version, however, in mirror image arrangement with integrated start-up braking for a front-cross-arrangement in passenger car, FIGS. 7, 9, 9 example series of gear ratios for a transmission in accord with FIG. 1, FIGS. 10, 11 example series of gear ratios for a transmission in accord with FIG. 2, and FIG. 12 a flow diagram for a transmission in accord with the invention.

DETAILED DESCRIPTION OF THE INVENTION

Figure 1:
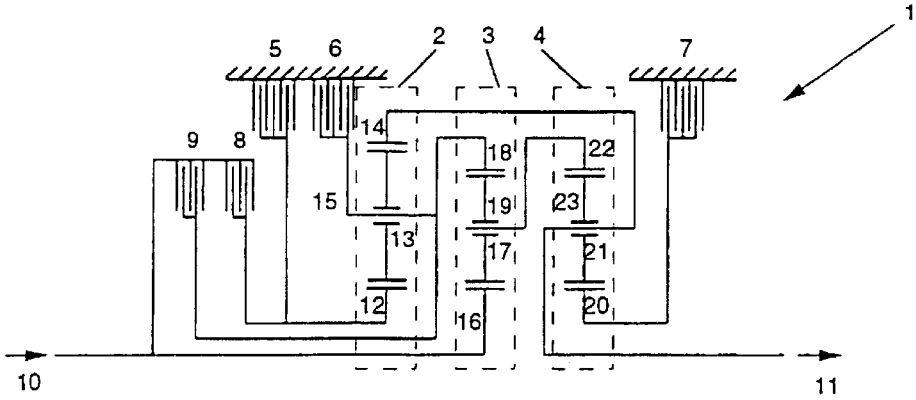
FIG. 1 in schematic presentation, a transmission with coaxial power input and output in accord with a first version, FIG. 2 in schematic presentation, a transmission with coaxial power input and output in accord with a second version, FIG. 3 in schematic presentation, a transmission in accord with the first version with the power input on the power output side, FIG. 4 in schematic presentation, a transmission in accord with the first version, with power output between the planetary sets and the clutches.

The internal gear 14 of the first planetary set 2 stands continually in connection with the spider 23 of the third planetary set 4 and, in turn, this spider 23 is continually in connection with the power output shaft 11. The following components can be braked against the transmission housing: the sun gear 12 of the first planetary set by means of the first brake 5, the spider 15 of the first planetary set 2 by means of the second brake 6, the internal gear 18 of the second planetary set 3 also by means of the second brake 6, and the sun gear 20 of the third planetary set 4 by means of the third brake 7.

The same components in different Figures or components with the same function are provided with the same reference numbers.

In a further development in accord with the second version of the invented transmission (FIG. 2), again with coaxial input and output drive shafts, respectively 10, 11, the planetary sets 2, 3, 4, the brakes 5, 6, 7 as well as the couplings 8 and 9, essentially, are arranged as before as was shown in FIG. 1. However, this second version differentiates itself from the first version by the means of the interconnection of the individual components.

Thus in this case, the sun gears 12 and 16 of the first and second planetary sets can likewise be connected with, or be in continual connection with the input drive shaft. The power output shaft 11, on the other hand, is in continual connection with the spider 19 of the second planetary set 3 and this, in turn, is in continual connection with the internal gear 14 of the first planetary set 2. The spider 15 of the first planetary set 2 is further continually connected with the internal gear 22 of the third planetary set 4 and the internal gear 18 of the second planetary set 3 is continually connected to the spider 23 of the third planetary set 4. The spider 15 as well as the internal gear 22 can be, in this way, by means of the brake 6, attached to the transmission housing, as can be the sun gear 20 by means of the brake 7.

Figure 3:
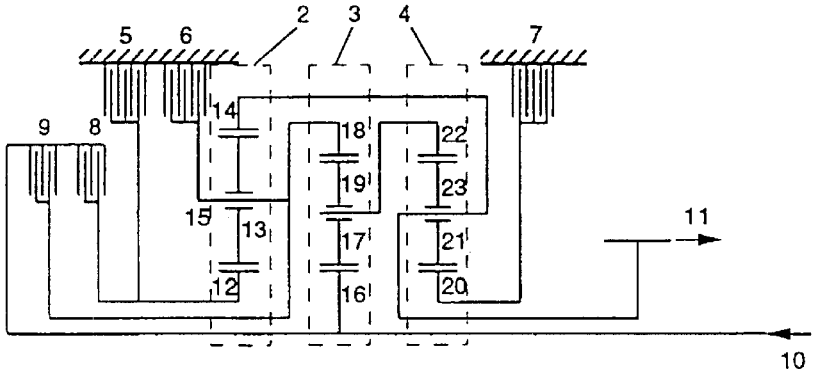

The design of the transmission in accord with FIG. 3, represents, essentially, the first version shown in FIG. 1. In this case, however, the alternative is, that the input drive 10 and the output drive 11 are provided on the same side of the transmission.

Figure 4:
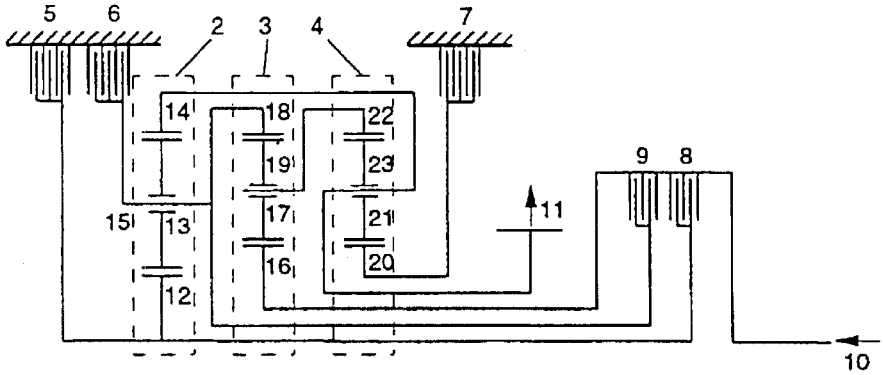

A further alternative arrangement of the transmission is shown in FIG. 4, wherein the input power sequences through the transmission by means of the input drive 10 to the sun gear 16 and simultaneously through the clutches 8 and 9 to the sun gear 12 as well as to the spider 15 which connects to the internal gear 18. The output drive 11 is placed in the transmission between the planetary sets 2, 3, 4 and the clutches 8 and 9.

A development of the transmission arrangement based on the first version (FIG. 5), provides, that the input drive be made through a torque converter 24. The turbine wheel of the torque converter 24 is directly connectable with the sun gear 16 and the second planetary set 3, or is connectable by means of the clutches 8 and 9 with the first or second planetary set 2, 3.

A further alternative arrangement of the invented transmission is presented in FIG. 6, showing an integrated start-up brake for a front-end, cross motor setup in a passenger car. The transmission in this case corresponds to a mirror image design of the first version of the transmission as shown in FIG. 1, wherein, however, the input and output drive shaft 10 and 11 respectively, are placed on the same side. Additionally, between an internal combustion engine 25 and the input drive shaft 10 is found a torsion, vibration damper 26. The power output shaft 11 is, by means of an additional gear ratio stage and a different 27, connected to the drive wheels 28 and 29.

From FIGS. 7, 8, 9, the examples of gear ratio series for the invented transmission in accord with FIG. 1, it may be seen, that the gear ratio i in the first gear lies between 4.84 and 5.70, and the entire stage range $\phi_{ges}$ lies between 6.32 and 7.34. The ratio i in the fifth gear is always 1.

Figure 2:
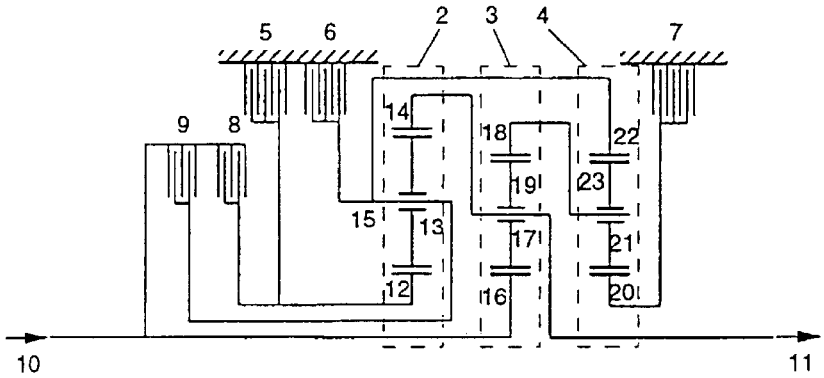

[for] *For* a transmission in accord with FIG. 2, the two examples of gear ratio series (FIGS. 10, 11), exhibit a ratio i in the first gear between 3.83 or 3.87 at an entire stage range $\phi_{ges}$ of [0.48] *4.88* to 5.06. The ratio i in the fifth gear shows likewise 1.00. The fifth gear is, in all ratio series, is designed advantageously as *a* direct gear.

From the flow diagram of shifting in accord with the presentation of FIG. 12, it may be seen that in the case of sequential shifting, double shifting is avoided, since two neighboring gear stages always employ one switching element in common. From this flow diagram in FIG. 12, one can also see, that in the case of any optional shifting between the first and fourth gears, as well as between the fourth and sixth gears, at any time, only switching element is activated. The shift position of a braked neutral is possible through the activation of the brakes B1 and B2, whereby a blockage of the output drive is made and a simultaneous, defined speed of rotation can be achieved in the transmission, possibly useful for a hill-holding function.

At the same time, free wheeling at each position of the transmission can be brought about, thus, for instance, between the shaft and the housing, or between two shafts, in order to divide one shaft into two. A neutral position can be effected by the closure of one shifting element and the opening of another, for instance, by closing the first brake 5, *B1* and opening the second brake 6, *B2* for a neutral position forwards.

Further, the input drive shaft 10 can be separated from the motor by a clutch element, whereby the clutch element, for instance, can be designed as a dry or wet start-up clutch, a magnetic powder clutch, a centrifugal, a hydrodynamic clutch or a similar clutch device. Further, the input drive shaft 10 can also be separated from the motor by means of a conversion element, wherein this may be designed as a hydrodynamic converter, as a differential converter, as a start-up retarder, as a hydrostatic transmission, or an electrical transmission or again as an electrodynamic clutch.

Further, the input drive shaft 10 can also be separated from the motor by a conversion element, wherein this could be designed as a hydrodynamic converter, as a differential converter, as a start-up retarder, as a hydrostatic transmission, as an electrical transmission or as an electromechanical transmission or the like. This means, that between the motor and the drive, an additional ratio stage with a constant or even a variable ratio which was equal to or greater than one.

Alternatively, a start-up element can also be placed behind the drive, so that the input shaft 10 is firmly bond with the clutch shaft of a motor. In such a case, the start-up is carried out by a shifting element of the transmission, for instance, by means of the second brake 6.

In addition a slip-free brake, for instance a hydraulic or electrical retarder or the like, can be placed on each shaft, preferably on the input shaft 10 or the output shaft 11.

Also a power takeoff shaft can be provided for the input power from additional components on each shaft, preferably, however, on the input shaft 10 and the output shaft 11.

The shifting elements themselves comprise powershift clutches or brakes, such as lamellar clutches, band brakes, conic clutches or the like.

The shifting elements can, however, be made of form-fit clutches or brakes, for instance dog clutches or synchronization.

What is claimed is:

1. A transmission (1) for a motor vehicle having a capability of automatic shifting, the transmission (*1*) having [three spider planetary sets (2, 3, 4) in which] a first planetary set (2) [is on an entry side of the transmission (1)], a third planetary set (4) [is on an exit side of the transmission (1)] and a second planetary set (3) [is] located between the first planetary set (2) and the third planetary set (4), the transmission (1) possessing first, second and third brakes (5, 6, 7) and first and second clutches (8, 9) for [the] shifting of six forward gears and one reverse gear, and having one input shaft (10) and one output shaft (11) with the following combinations:

the input shaft (10) is connected directly with a sun gear (16) of the second planetary set (3);

the input shaft (10) is connectable by the first clutch (8) with a sun gear (12) of the first planetary set (2) and connectable with a spider (15) of the first planetary set (2) by the second clutch (9);

the sun gear (12) of the first planetary set (2) is connectable with a housing of the transmission (1) by the first brake (5); and the spider (15) of the first planetary set (2) is connectable with the housing of the transmission by the second brake (6);

wherein a sun gear (20) of the third planetary set (4) is freely rotatable with respect to the sun, the spider and the internal gears of the first and second planetary sets and is connectable solely with the transmission housing when the third brake (7) is engaged[; and the output shaft (11) is fixedly connected with a spider (19) of the second planetary set (3) and is fixedly connected with an internal gear (14) of the first planetary set (2)].

2. The motor vehicle transmission with automatic shifting capability according to claim 1, wherein the spider (15) of the first planetary set (2) is continually connected with the internal gear (22) of the third planetary set (4) and the internal gear (18) of the second planetary set (3) is continually connected to the spider (23) of the third planetary set (4).

3. The motor vehicle transmission with automatic shifting capability according to claim 1 wherein the first clutch (8) is activated in a third gear and in a fifth gear, as well as in a reverse gear.

4. The motor vehicle transmission with automatic shifting capability according to claim 1, wherein the second clutch (9) is activated in a fourth gear, in a fifth gear and in a sixth gear.

5. The motor vehicle transmission with automatic shifting capability according to claim 1, wherein the first [break] *brake* (5) is activated in a second gear and in a sixth gear.

6. The motor vehicle transmission with automatic shifting capability according to claim 1, wherein the [second] *third* brake [(6)] (*7*) is activated in a first gear, in a second gear, in a third gear and in a fourth gear.

7. The motor vehicle transmission with automatic shifting capability according to claim 1, wherein the second brake (6) is activated in a first gear and in a reverse gear.

8. A transmission (1) for a motor vehicle having a capability of automatic shifting, the transmission (*1*) having [three spider planetary sets (2, 3, 4) in which] a first planetary set (2) [is on an entry side of the transmission (1)], a third planetary set (4) [is on an exit side of the transmission (1)], and a second planetary set (3) [is] located between the first planetary set (2) and the third planetary set (4), the transmission (1) possessing first, second and third brakes (5, 6, 7) and first and second clutches (8, 9) for [the] shifting of six forward gears and one reverse gear, and having one input shaft (10) and one output shaft (11) with the following combinations:

the input shaft (10) is connected directly with a sun gear (16) of the second planetary set (3);

the input shaft (10) is connectable by the first clutch (8) with a sun gear (12) of the first planetary set (2) and connectable with a spider (15) of the first planetary set (2) by the second clutch (9);

the sun gear (12) of the first planetary set (2) is connectable with a housing of the transmission (1) by the first brake (5);

the spider (15) of the first planetary set (2) is connectable with the housing of the transmission by the second brake (6);

wherein a sun gear (20) of the third planetary set (4) is connectable with the transmission housing by the third brake (7);

the output shaft (11) is fixedly connected with a spider (19) of the second planetary set (3) and is fixedly connected with an internal gear (14) of the first planetary set (2), and the spider (15) of the first planetary set (2) is fixedly connected with an internal gear (22) of the third planetary set (4) and an internal gear (18) of the second planetary set (3) is fixedly connected to a spider (23) of the third planetary set (4).

9. The motor vehicle transmission with automatic shifting capability according to claim 8, wherein the first clutch (8) is activated in a third gear and in a fifth gear, as well as in a reverse gear.

10. The motor vehicle transmission with automatic shifting capability according to claim 8, wherein the second clutch (9) is activated in a fourth gear, in a fifth gear and in a sixth gear.

11. The motor vehicle transmission with automatic shifting capability according to claim 8, wherein the first [break] *brake* (5) is activated in a second gear and in a sixth gear.

12. The motor vehicle transmission with automatic shifting capability according to claim 8, wherein the [second] *third* brake [(6)] (*7*) is activated in a first gear, in a second gear, in a third gear and in a fourth gear.

13. The motor vehicle transmission with automatic shifting capability according to claim 8, wherein the second brake (6) is activated in a first gear and in a reverse gear.

[14. A transmission (1) for a motor vehicle having a capability of automatic shifting, the transmission having three spider planetary sets (2, 3, 4) in which a first planetary set (2) is on an entry side of the transmission (1), a third planetary set (4) is on an exit side of the transmission (1) and a second planetary set (3) is located between the first planetary set (2) and the third planetary set (4), the transmission (1) possessing first, second and third brakes (5, 6, 7) and first and second clutches (8, 9) for the shifting of six forward gears and one reverse gear, and having one input shaft (10) and one output shaft (11) with the following combinations:

the input shaft (10) is connected directly with a sun gear (16) of the second planetary set (3);

the input shaft (10) is connectable by the first clutch (8) with a sun gear (12) of the first planetary set (2) and connectable with a spider (15) of the first planetary set (2) by the second clutch (9);

the sun gear (12) of the first planetary set (2) is connectable with a housing of the transmission (1) by the first brake (5);

the spider (15) of the first planetary set (2) is connectable with the housing of the transmission by the second brake (6);

wherein a sun gear (20) of the third planetary set (4) is connectable with the transmission housing by the third brake (7);

the output shaft (11) is fixedly connected with a spider (19) of the second planetary set (3) and is fixedly connected with an internal gear (14) of the first planetary set (2), and a first clutch (8) is activated in a third gear, in a fifth gear and in a reverse gear.]

[15. The motor vehicle transmission with automatic shifting capability according to claim 14, wherein the second clutch (9) is activated in a fourth gear, in a fifth gear and in a sixth gear.]

[16. The motor vehicle transmission with automatic shifting capability according to claim 14, wherein the first break (5) is activated in a second gear and in a sixth gear.]

[17. The motor vehicle transmission with automatic shifting capability according to claim 14, wherein the second brake (6) is activated in a first gear, in a second gear, in a third gear and in a fourth gear.]

[18. The motor vehicle transmission with automatic shifting capability according to claim 14, wherein the second brake (6) is activated in a first gear and in a reverse gear.]

[19. A transmission (1) for a motor vehicle having a capability of automatic shifting, the transmission having three spider planetary sets (2, 3, 4) in which a first planetary set (2) is on an entry side of the transmission (1), a third planetary set (4) is on an exit side of the transmission (1) and a second planetary set (3) is located between the first planetary set (2) and the third planetary set (4), the transmission (1) possessing first, second and third brakes (5, 6, 7) and first and second clutches (8, 9) for the shifting of six forward gears and one reverse gear, and having one input shaft (10) and one output shaft (11) with the following combinations:

the input shaft (10) is connected directly with a sun gear (16) of the second planetary set (3);

the input shaft (10) is connectable by the first clutch (8) with a sun gear (12) of the first planetary set (2) and connectable with a spider (15) of the first planetary set (2) by the second clutch (9);

the sun gear (12) of the first planetary set (2) is connectable with a housing of the transmission (1) by the first brake (5);

the spider (15) of the first planetary set (2) is connectable with the housing of the transmission by the second brake (6);

wherein a sun gear (20) of the third planetary set (4) is connectable with the transmission housing by the third brake (7);

the output shaft (11) is fixedly connected with a spider (19) of the second planetary set (3) and is fixedly connected with an internal gear (14) of the first planetary set (2), and the second clutch (9) is activated in a fourth gear, in a fifth gear and in a sixth gear.]

[20. A transmission (1) for a motor vehicle having a capability of automatic shifting, the spider having three spider planetary sets (2, 3, 4) in which a first planetary set (2) is on an entry side of the transmission (1), a third planetary set (4) is on an exit side of the transmission (1) and a second planetary set (3) is located between the first planetary set (2) and the third planetary set (4), the transmission (1) possessing first, second and third brakes (5, 6, 7) and first and second clutches (8, 9) for the shifting of six forward gears and one reverse gear, and having one input shaft (10) and one output shaft (11) with the following combinations:

the input shaft (10) is connected directly with a sun gear (16) of the second planetary set (3);

the input shaft (10) is connectable by the first clutch (8) with a sun gear (12) of the first planetary set (2) and connectable with a spider (15) of the first planetary set (2) by the second clutch (9);

the sun gear (12) of the first planetary set (2) is connectable with a housing of the transmission (1) by the first brake (5);

the spider (15) of the first planetary set (2) is connectable with the housing of the transmission by the second brake (6);

wherein the sun gear (20) of the third planetary set (4) is connectable with the transmission housing by the third brake (7);

the output shaft (11) is fixedly connected with a spider (19) of the second planetary set (3) and is fixedly connected with an internal gear (14) of the first planetary set (2), and the first brake (5) is activated in a second gear and in a sixth gear.]

[21. A transmission (1) for a motor vehicle having a capability of automatic shifting, the transmission having three spider planetary sets (2, 3, 4) in which a first planetary set (2) is on an entry side of the transmission (1), a third planetary set (4) is on an exit side of the transmission (1) and a second planetary set (3) is located between the first planetary set (2) and the third planetary set (4), the transmission (1) possessing first, second and third brakes (5, 6, 7) and first and second clutches (8, 9) for the shifting of six forward gears and one reverse gear, and having one input shaft (10) and one output shaft (11) with the following combinations:

the input shaft (10) is connected directly with a sun gear (16) of the second planetary set (3);

the input shaft (10) is connectable by the first clutch (8) with a sun gear (12) of the first planetary set (2) and connectable with a spider (15) of the first planetary set (2) by the second clutch (9);

the sun gear (12) of the first planetary set (2) is connectable with a housing of the transmission (1) by the first brake (5);

the spider (15) of the first planetary set (2) is connectable with the housing of the transmission by the second brake (6);

wherein a sun gear (20) of the third planetary set (4) is connectable with the transmission housing by the third brake (7);

the output shaft (11) is fixedly connected with a spider (19) of the second planetary set (3) and is fixedly connected with an internal gear (14) of the first planetary set (2), and the third brake (7) is activated in a first gear, in a second gear, in a third gear and in a fourth gear.]

*22. The motor vehicle transmission with automatic shifting capability according to claim 1, wherein the input shaft (10) and the output shaft (11) are both located on the same side of the transmission.*

*23. The motor vehicle transmission with automatic shifting capability according to claim 1, wherein the input shaft (10) supplies drive input:*

*to the sun gear (16) of the second planetary set (3);*

*to the sun gear (12) of the first planetary set (2) via the first clutch (8); and*

*to the spider (15) of the first planetary set (2) which is connected to the internal gear (18) of the second planetary set (3) via the second clutch (9); and*

*an output of the output shaft (11) is located between the first, second and third planetary sets (2, 3 and 4) and the first and second clutches (8 and 9).*

*24. The motor vehicle transmission with automatic shifting capability according to claim 1, wherein the input shaft (10) includes a torque converter (24) and a turbine wheel of the torque converter (24) is connected directly with the sun gear (16) of the second planetary set (3).*

*25. The motor vehicle transmission with automatic shifting capability according to claim 1, wherein a vibration damper (26) is located between the input shaft (10) an internal combustion engine (25).*

*26. The motor vehicle transmission with automatic shifting capability according to claim 1, wherein the input shaft (10) and the output shaft (11) are both located on the same side of the transmission; and*

*a vibration damper (26) is located between the input shaft (10) an internal combustion engine (25).*

*27. The motor vehicle transmission with automatic shifting capability according to claim 1, wherein drive is supplied by the output shaft (11) to the drive wheels (28 and 29) by an additional gear ratio stage and a differential (27).*

*28. A transmission (1) for a motor vehicle having a capability of automatic shifting, the transmission having first, second and third spider planetary sets (2, 3, 4) in which a second planetary set (3) is located between a first planetary set (2) and a third planetary set (4), the transmission (1) possessing first, second and third brakes (5, 6, 7) and first and second clutches (8, 9) for shifting of six forward gears and a reverse gear, and having an input shaft (10) and an output shaft (11) with the following combinations:*

*the input shaft (10) is connected directly with a sun gear (16) of the second planetary set (3);*

*the input shaft (10) is connectable by the first clutch (8) with a sun gear (12) of the first planetary set (2) and connectable with a spider (15) of the first planetary set (2) by the second clutch (9);*

*the sun gear (12) of the first planetary set (2) is connectable with a housing of the transmission (1) by the first brake (5);*

*the spider (15) of the first planetary set (2) is connectable with the housing of the transmission (1) by the second brake (6);*

*wherein a sun gear (20) of the third planetary set (4) is connectable with the housing of the transmission (1) by the third brake (7);*

*the output shaft (11) is fixedly connected with a spider (23) of the third planetary set (4) and with an internal gear (14) of the first planetary set (2);*

*the spider (15) of the first planetary set (2) is fixedly connected to an internal gear (18) of the second planetary set (3); and*

*a spider (19) of the second planetary set (3) is fixedly connected to an internal gear (22) of the third planetary set (4).*

*29. The motor vehicle transmission with automatic shifting capability according to claim 28, wherein the first clutch (8) is activated in a third gear and in a fifth gear, as well as in a reverse gear.*

*30. The motor vehicle transmission with automatic shifting capability according to claim 28, wherein the second clutch (9) is activated in a fourth gear, in a fifth gear and in a sixth gear.*

*31. The motor vehicle transmission with automatic shifting capability according to claim 28, wherein the first brake (5) is activated in a second gear and in a sixth gear.*

*32. The motor vehicle transmission with automatic shifting capability according to claim 28, wherein the third brake (7) is activated in a first gear, in a second gear, in a third gear and in a fourth gear.*

*33. The motor vehicle transmission with automatic shifting capability according to claim 28, wherein the second brake (6) is activated in a first gear and in a reverse gear.*

* * * * *